UNITED STATES PATENT OFFICE.

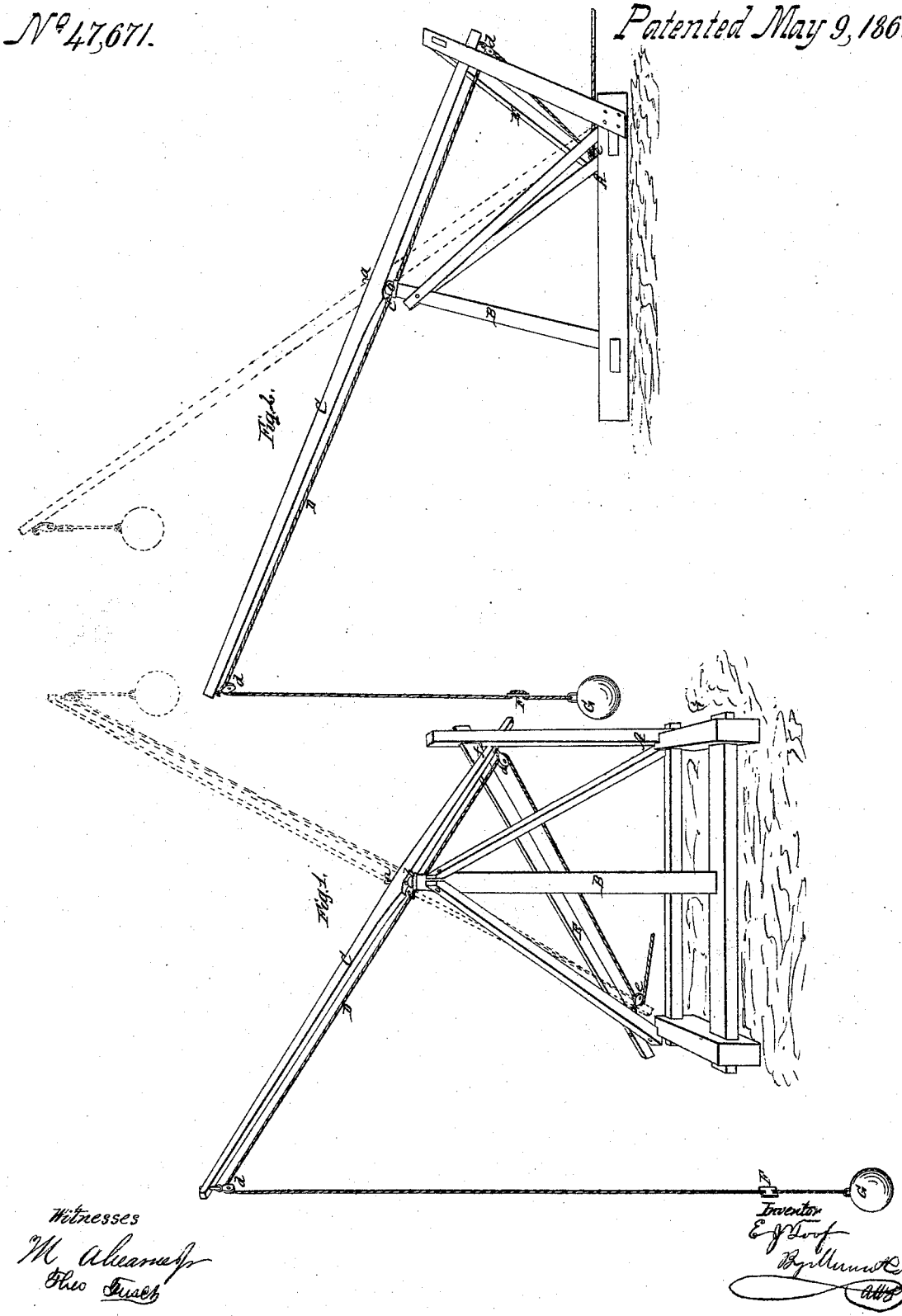

E. J. TOOF, OF FORT MADISON, IOWA.

IMPROVED HAY-ELEVATOR.

Specification forming part of Letters Patent No. 47,671, dated May 9, 1865.

*To all whom it may concern:*

Be it known that I, E. J. TOOF, of Fort Madison, in the county of Lee and State of Iowa, have invented a new and Improved Hay-Elevator; and I do hereby declare that the following is a full, clear, and exact description thereof, which will enable those skilled in the art to make and use the same, reference being had to the accompanying drawings, forming part of this specification, in which—

Figure 1, Sheet No. 1, is a front perspective view of my invention. Fig. 2, Sheet No. 2, is a side perspective view of the same.

Similar letters of reference indicate corresponding parts.

This invention relates to a new and improved device for elevating articles, and is more especially designed for stacking hay and grain.

The invention consists in the employment or use of a single pivoted beam or pole and a single rope applied to a framing and all arranged in such a manner that the hay, grain, or other article being raised will be elevated and deposited in the proper place by a single movement of the beam, as hereinafter set forth.

A represents a framing, which has an inclined standard or support, B, provided with a spindle, *a*, at its upper end, on which a beam or pole, C, is fitted and allowed to turn freely, the upper end of the standard or support being rounded in the form of a hemisphere, *b*, on which a concave bearing, *e*, at the under side of the beam or pole bears or rests. To the under side of the beam or pole C there are attached two pulley-blocks, *d d*—one near each end—through which a rope, D, passes, said rope at the inner end of the beam or pole passing through a pulley-block, *e*, attached to the lower part of the framing A, near the lower end of an inclined bar, E, fitted or secured thereon, and underneath which the inner end of the beam or pole C works or bears.

On the rope D there is fitted a metal plate, F, which may be moved or adjusted on the rope to any desired point, and the under side of the inclined bar E, at its upper end, is cut or formed so as to have a short inclined plane or notch, *f*, which serves to hold the inner end of the beam or pole C under the pull of rope D until the hay or other article attached to the outer end of the rope is elevated so as to be near the outer end of the beam or pole.

The operation is as follows: The hay or other article to be elevated is secured to the outer end of rope D, the inner end of the beam or pole being at the upper end of the inclined bar E and against the short inclined plane or notch *f*, as shown in black in Figs. 1 and 2. The rear end of rope D is then pulled, either by a horse or other power, and the hay or other article (indicated by the bale G) will be raised vertically toward the outer end of the beam or pole C, the short inclined plane or notch *f* preventing the beam or pole from moving under the pull of the rope, as before stated. When the hay or other article is elevated to a sufficient height, the stop or plate F comes in contact with the pulley-block *d* at the outer end of the beam or pole, and the movement of rope D being thus arrested, the pull will come or act upon the inner end of the beam or pole, and said inner end of the beam or pole will be drawn down underneath the inclined bar E, and the outer end of the beam or pole swung or turned laterally in an upward direction, so that the hay or other article will be brought over the spot where it is to be dropped or deposited, the beam or pole, when relieved of its load, being allowed to return to its original or first-mentioned position by its own gravity, the beam or pole being loaded or pivoted with a view to that end.

Thus by this very simple arrangement hay and grain may be stacked, and other articles elevated with the greatest facility.

The device may be constructed at a small cost, and there are no parts liable to become deranged by use or to get out of repair.

I claim as new and desire to secure by Letters Patent—

1. The pivoted beam or pole C, provided with a rope, D, in connection with an inclined guide bar, E, all being applied to a suitable framing, A, and arranged to operate in the manner substantially as and for the purpose set forth.

2. The adjustable plate or stop F on the rope D, when used in connection with the pivoted beam or pole C and inclined bar E, for the purpose specified.

3. The short inclined plane or notch *f* at the under side of the inclined bar E, for the purpose specified.

E. J. TOOF.

Witnesses:
J. G. WILLSON,
CHAS. T. MARTIN.